(12) United States Patent
Yoshida et al.

(10) Patent No.: US 9,488,850 B2
(45) Date of Patent: Nov. 8, 2016

(54) RETENTION MECHANISM, DRIVING APPARATUS, AND BLUR CORRECTION APPARATUS

(71) Applicant: OLYMPUS CORPORATION, Shibuya-ku, Tokyo (JP)

(72) Inventors: Shuichi Yoshida, Tama (JP); Takashi Okamura, Hachioji (JP); Naoyuki Shibata, Akiruno (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/921,519

(22) Filed: Oct. 23, 2015

(65) Prior Publication Data
US 2016/0041403 A1 Feb. 11, 2016

Related U.S. Application Data

(62) Division of application No. 14/321,327, filed on Jul. 1, 2014, now Pat. No. 9,235,061.

(30) Foreign Application Priority Data

Sep. 12, 2013 (JP) ................. 2013-189877
Sep. 12, 2013 (JP) ................. 2013-189878

(51) Int. Cl.
*G03B 5/00* (2006.01)
*G02B 27/64* (2006.01)
*F16F 6/00* (2006.01)
*H01F 7/02* (2006.01)
*H01F 7/06* (2006.01)
*H04N 5/232* (2006.01)

(52) U.S. Cl.
CPC ............... *G02B 27/646* (2013.01); *F16F 6/00* (2013.01); *G02B 27/64* (2013.01); *G03B 5/00* (2013.01); *H01F 7/0242* (2013.01); *H01F 7/06* (2013.01); *H04N 5/2328* (2013.01)

(58) Field of Classification Search
CPC combination set(s) only.
See application file for complete search history.

(56) References Cited

U.S. PATENT DOCUMENTS

| 5,513,047 | A | 4/1996 | Matsui |
| 6,288,854 | B1 | 9/2001 | Toyoda |
| 8,390,689 | B2 | 3/2013 | Inoue et al. |
| 2013/0176620 | A1 | 7/2013 | Sato |

FOREIGN PATENT DOCUMENTS

JP  2013088684 A  *  5/2013

OTHER PUBLICATIONS

JP2013-088684A English Machine Translation available from JPO website.*

* cited by examiner

*Primary Examiner* — Minh Phan
(74) *Attorney, Agent, or Firm* — Holtz, Holtz & Volek PC

(57) ABSTRACT

A retention mechanism includes a fixed part including a magnet, and a movable part opposed to the fixed part. A plurality of rolling elements are provided between the fixed part and the movable part, and the movable part is movable in a plane direction. A magnetic material which forms, in combination with the magnet, a magnetic spring is provided on the movable part. The magnetic spring generates a magnetic attraction force which attracts the movable part to the fixed part. The magnetic material is extended along a direction in which magnetic poles of the magnet are arrayed.

4 Claims, 16 Drawing Sheets

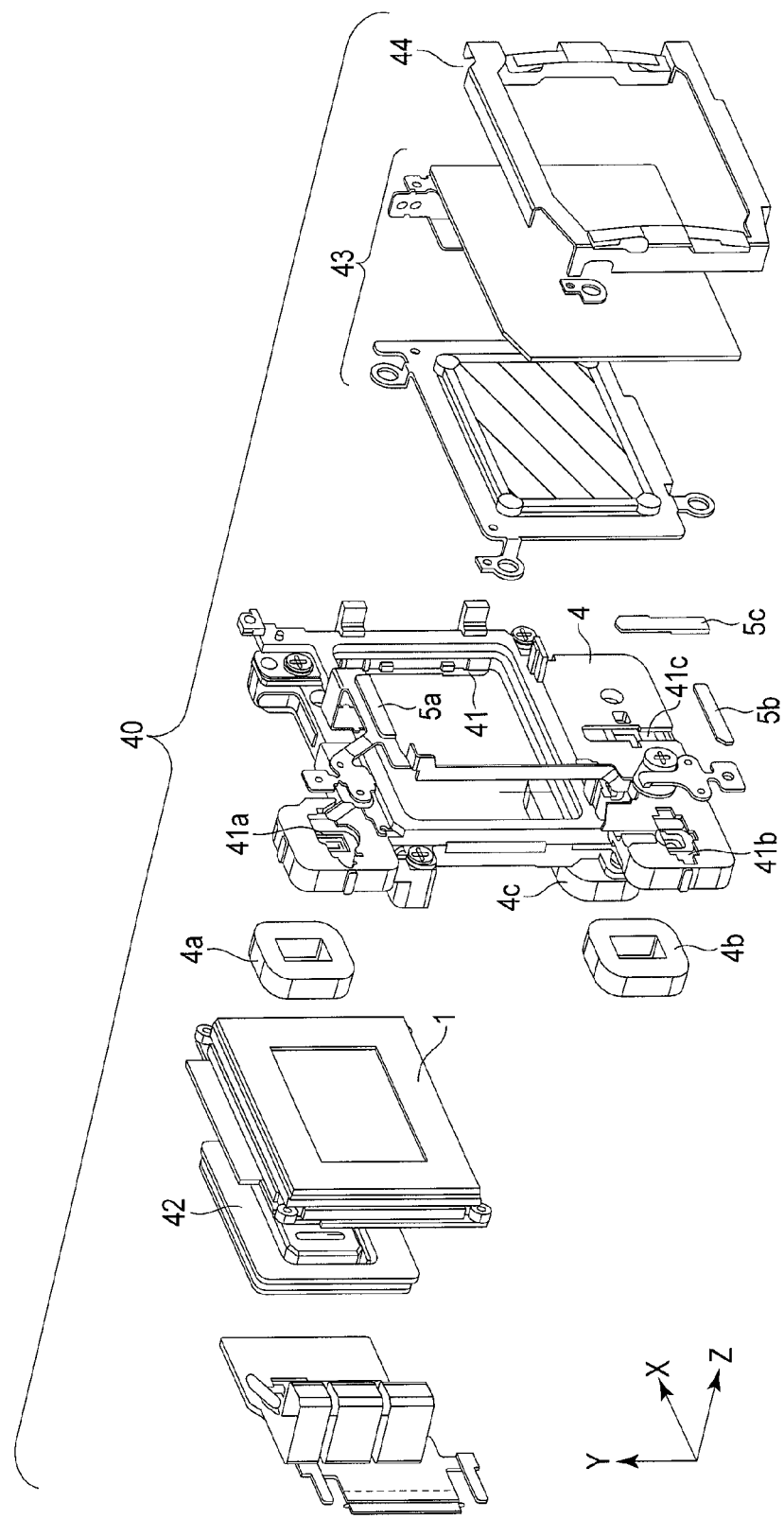
F I G. 6

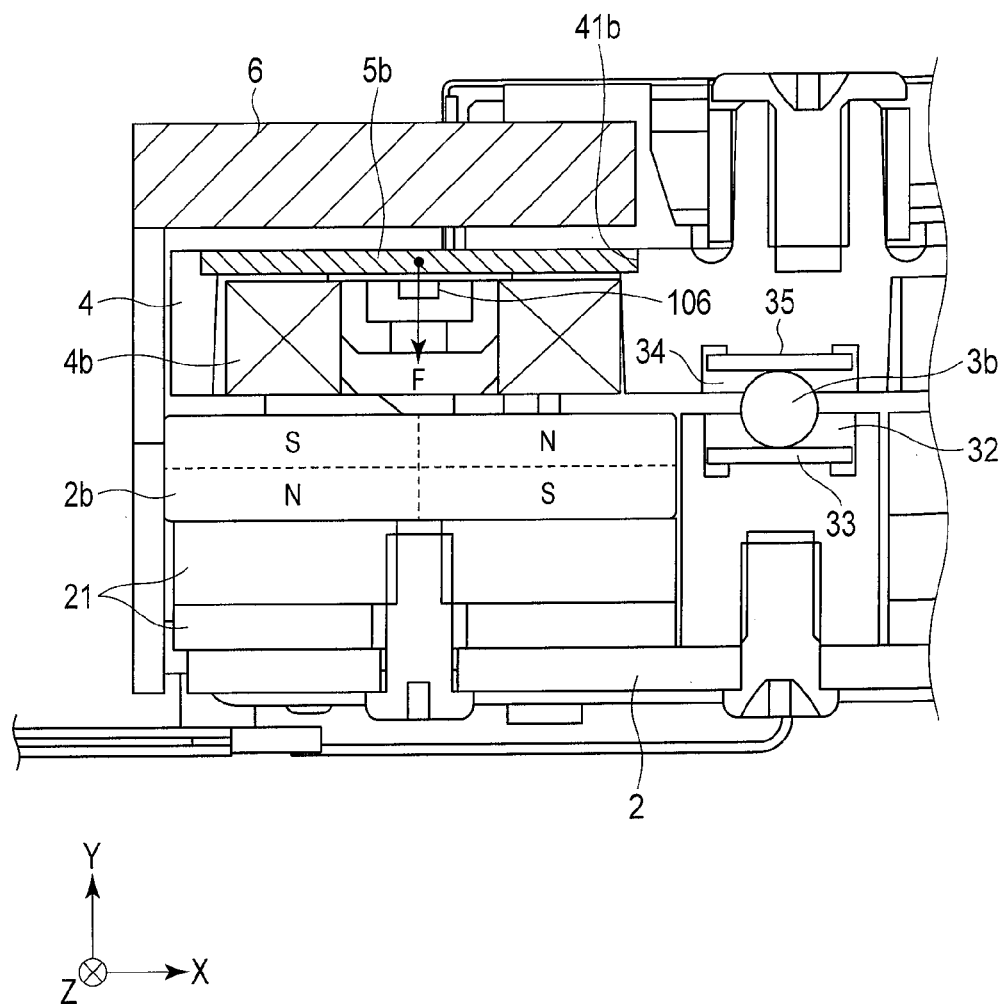
F I G. 11

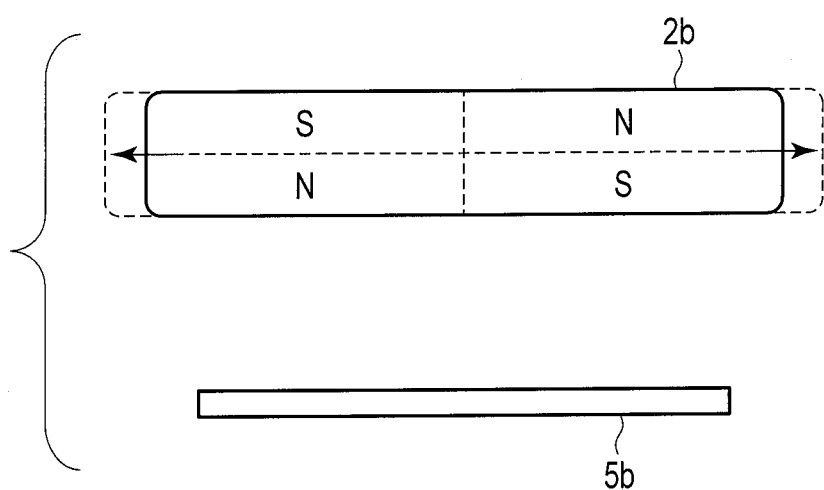
F I G. 20

RETENTION MECHANISM, DRIVING APPARATUS, AND BLUR CORRECTION APPARATUS

CROSS-REFERENCE TO RELATED APPLICATIONS

This application is a Divisional application of U.S. Ser. No. 14/321,327, filed Jul. 1, 2014, which is based upon and claims the benefit of priority from Japanese Patent Application No. 2013-189877, filed Sep. 12, 2013, and No. 2013-189878, filed Sep. 12, 2013; the entire contents of all of which are incorporated herein by reference.

FIELD

Embodiments described herein relate generally to a retention mechanism which holds a movable part movable in a plane direction perpendicular to an array direction thereof in relation to a fixed part, a driving apparatus which moves the movable part in the plane direction in relation to the fixed part, and a blur correction apparatus using the retention mechanism and/or the driving apparatus.

BACKGROUND

Conventionally, as a blur correction apparatus, there is an known apparatus which corrects a camera shake by moving a movable part holding a lens or an imaging element (optical member) of a camera along a plane perpendicular to an optical axis in relation to a fixed part.

This type of blur correction apparatus generally comprises a plurality of balls as a spacer which is arranged between a movable part and a fixed part, a plurality of coil springs which draw and tension the movable part toward the fixed part so as to sandwich the plurality of balls in the optical axis direction, and two sets of voice coil motors (VCMs) which move the movable part in the plane direction in relation to the fixed part.

The VCM ordinarily comprises a magnet provided on one of the movable part and the fixed part, a coil provided on the other one of the movable part and the fixed part, and at least one yoke which forms a magnetic circuit in combination with the magnet and the coil. The yoke is provided on at least one of the movable part and the fixed part.

Another retention mechanism is also known which uses a magnetic spring to attract and hold the movable part to the fixed part, in place of providing a plurality of coil springs. As an example of the magnetic spring, there is a known configuration in which a movable part is attracted to a fixed part by using a magnetic attraction force between a magnet provided on the movable part (or fixed part) and a yoke provided on the fixed part (or movable part), to hold the movable part between both parts (for example, Jpn. Pat. Appln. KOKAI Publication No. 2013-88684). That is, when such a magnetic spring is used, no coil spring is required and the apparatus configuration can be simplified accordingly.

However, in an apparatus using this type of magnetic spring, there is a difficulty in obtaining appropriate magnetic attraction force of magnification for holding a movable part at a fixed part without spoiling an original function (i.e., the function to improve output of the VCM). It is therefore difficult to simultaneously perform both functions satisfactorily.

Since the yoke ordinarily has a size substantially equal to a magnet, the magnetic attraction force which is generated in combination with the magnet is greater, compared with the attractive force of a coil spring when this kind of magnetic spring is used. Therefore, the force with which a plurality of balls are sandwiched in an optical axis direction becomes excessive, and the movable part and fixed part tend to be easily worn out and degraded due to sliding contact with the balls.

Also, when this type of magnetic spring is used, a magnet or a yoke needs to be provided on the movable part. In any case, the movable part is heavy, and power consumption of the VCM therefore increases.

The present invention has been made in view of circumstances as described above and has an object of providing a retention mechanism capable of attracting a movable part toward a fixed part with appropriate force, a driving apparatus capable of efficient stable operation without an increase in weight of the movable part, and a blur correction apparatus using the retention mechanism and/or the driving apparatus.

BRIEF DESCRIPTION OF THE DRAWINGS

FIG. 6 is an exploded perspective view of a movable part of the vibration-proof unit in FIG. 3;

FIG. 11 is an enlarged partial sectional view showing the vibration-proof unit in FIG. 10 which is cut along F11-F11;

FIG. 20 is a view showing a modification when a coil is provided on a movable part.

DETAILED DESCRIPTION

Hereinafter, embodiments of the invention will be described with reference to the drawings.

Figure 1:
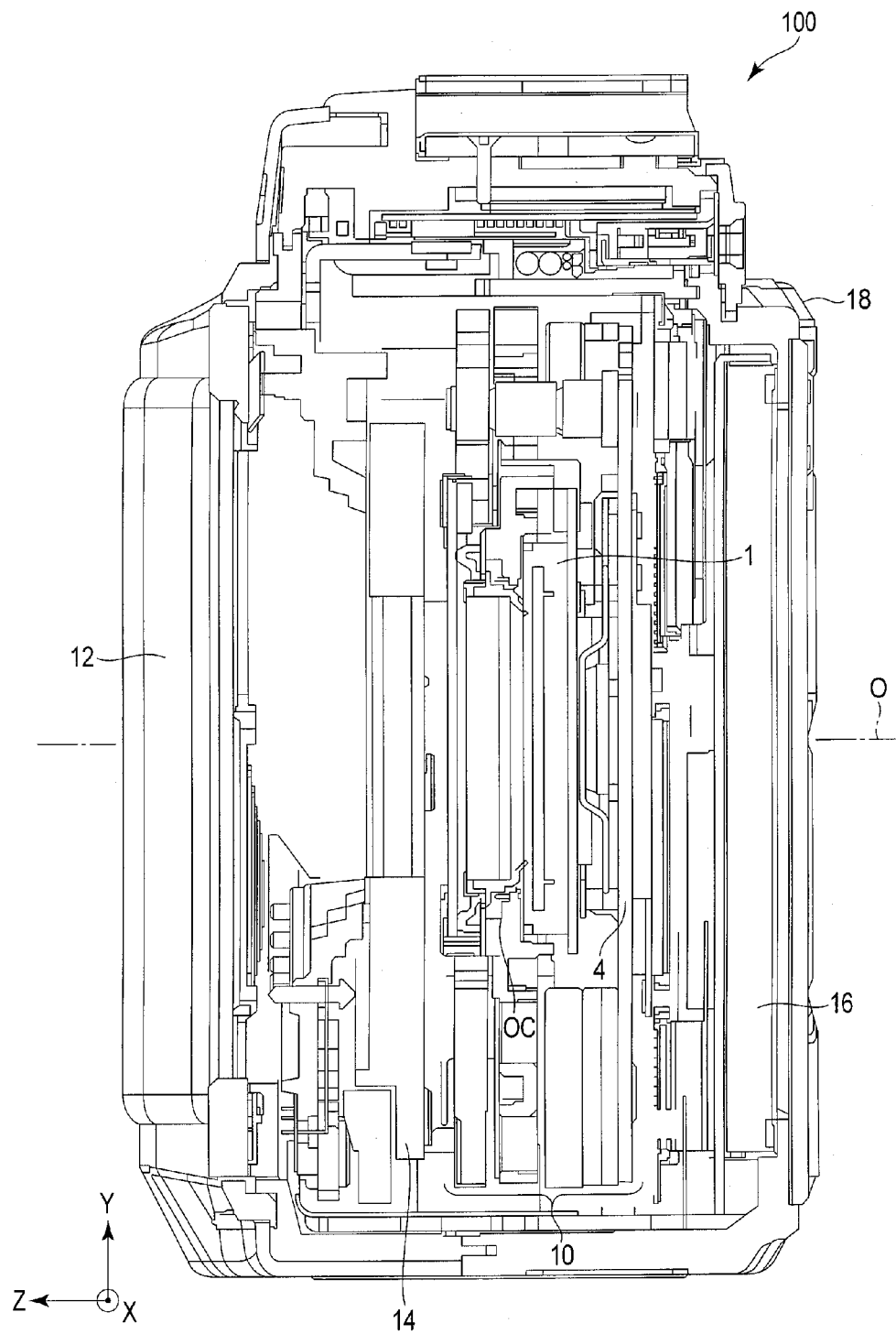
FIG. 1 is sectional view of a camera according to an embodiment.

FIG. 1 is a sectional view of a camera 100 according to an embodiment. In descriptions below, a direction from the right to the left is supposed to face the front side, and the opposite direction thereof is supposed to face the rear side. Further, an axis corresponding to the optical axis O of the camera is supposed to be the Z-axis (axis in longitudinal directions). Two axes which are perpendicular to each other along a plane perpendicular to the Z-axis are supposed to be the Z-axis (horizontal axis) and the Y-axis (vertical axis).

The camera 100 comprises a lens unit 12, a shutter unit 14, a vibration-proof unit 10, and a display unit 16. The camera 100 comprises a case 18 which stores a plurality of units 12, 14, 10, and 16 arrayed in the direction of optical axis O (array direction). The vibration-proof unit 10 is an example of a driving apparatus and a blur correction apparatus.

The lens unit 12 forms an image of an unillustrated object onto an imaging element 1 (a driven member or an optical member) provided on the vibration-proof unit 10. The shutter unit 14 controls the time to expose the object to the imaging element 1 by controlling the opening/closing time. The vibration-proof unit 10 moves the imaging element 1 along a plane perpendicular to the optical axis O so that an image may not be blurred even when the camera 100 is vibrated at the time of photographing. The display unit 16 is provided on the back side of the case 18, and displays a digital image photoelectrically converted with the imaging element 1.

Hereinafter, the vibration-proof unit 10 according to the first embodiment will be described with reference to FIGS. 2, 3, 4, 5, and 6.

Figure 2:
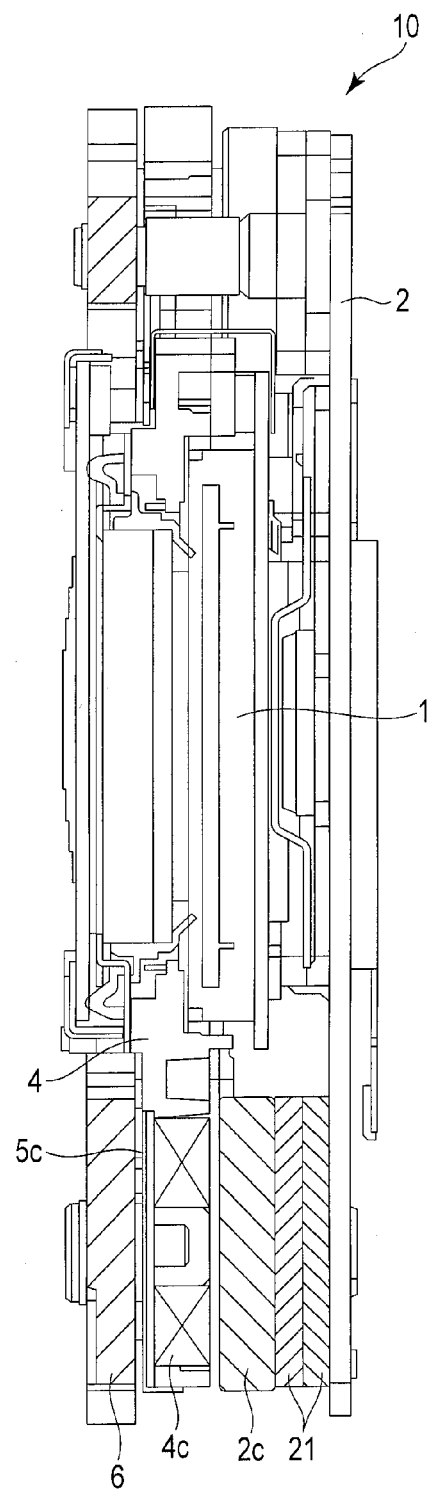
FIG. 2 is an enlarged sectional view showing a vibration-proof unit built in the camera in FIG. 1, according to the first embodiment.
Figure 3:
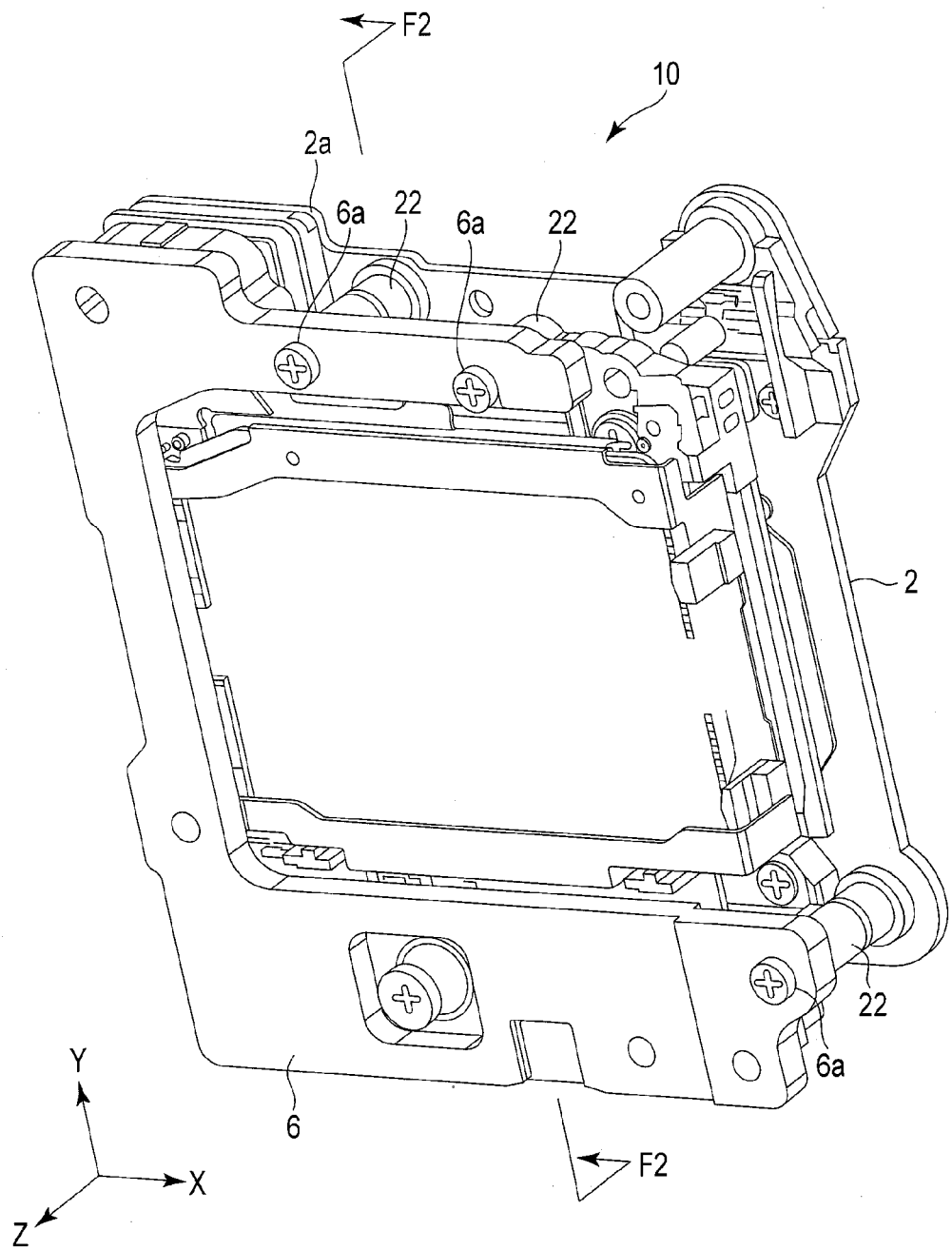
FIG. 3 is a perspective view of the vibration-proof unit in FIG. 2, viewed from an oblique front side.
Figure 4:
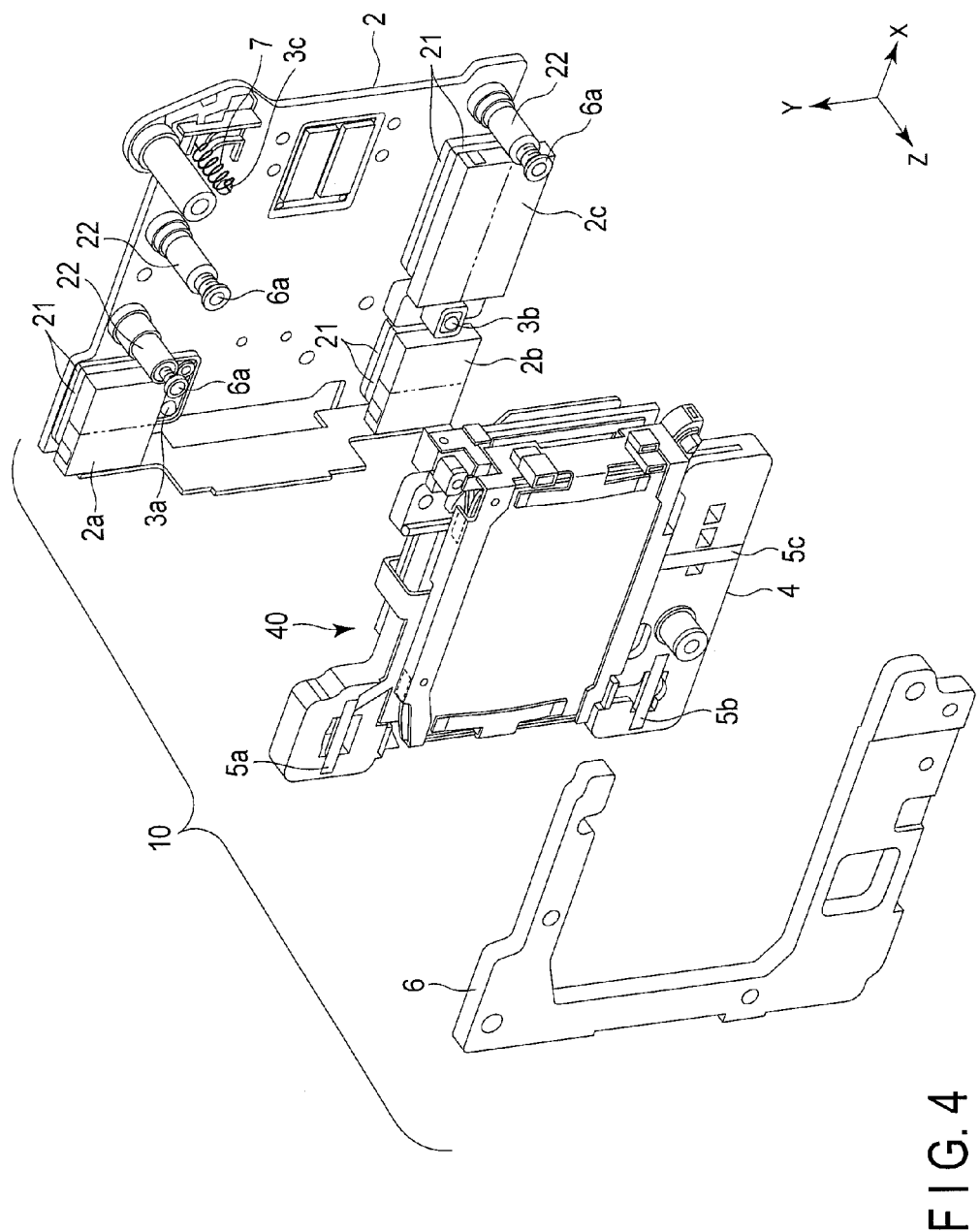
FIG. 4 is an exploded perspective view of the vibration-proof unit in FIG. 3.
Figure 5:
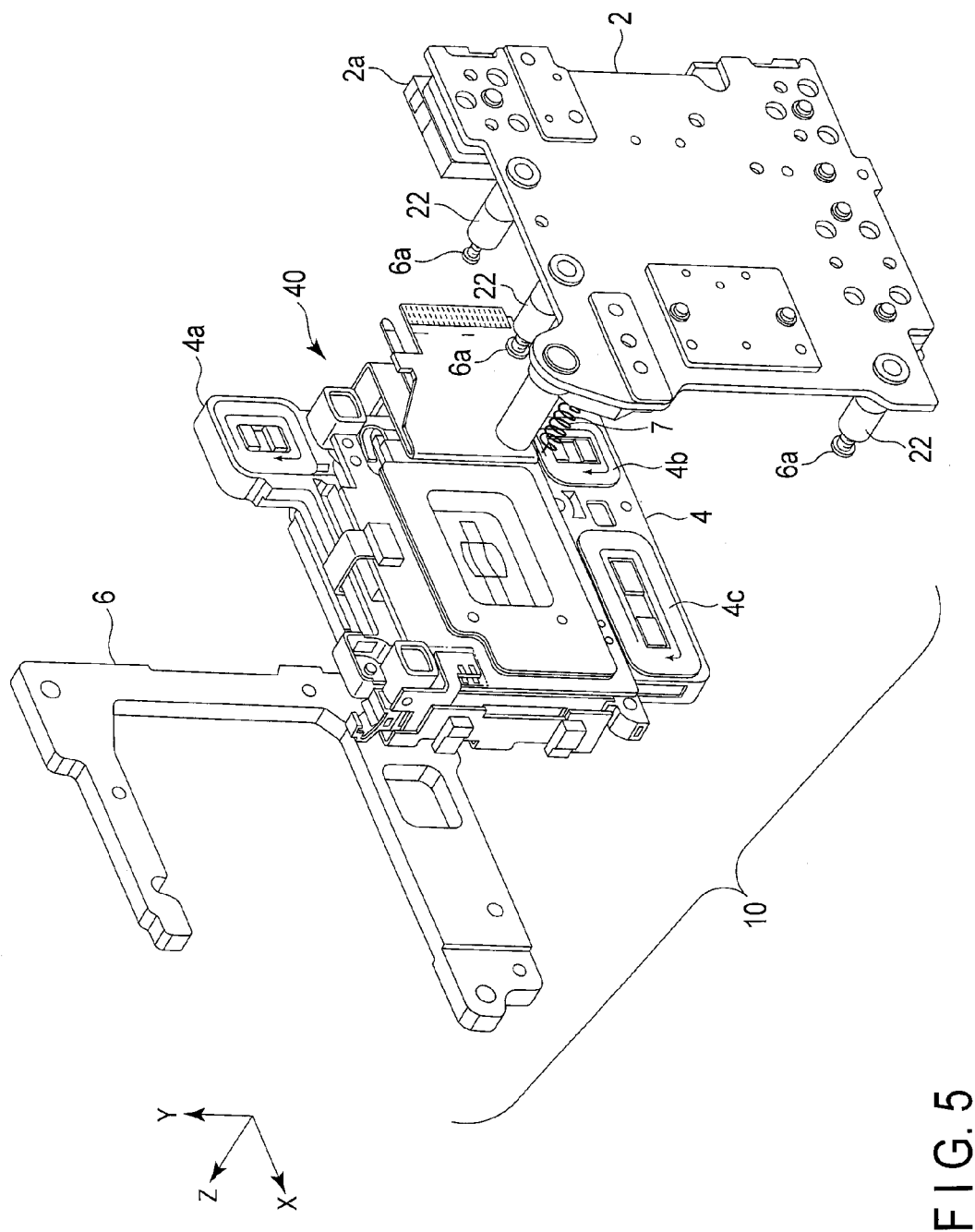
FIG. 5 is an exploded perspective view of the vibration-proof unit in FIG. 3, viewed from an oblique rear side.

FIG. 2 is an enlarged sectional view of the vibration-proof unit 10 in FIG. 1. FIG. 3 is a perspective view of the vibration-proof unit 10 viewed from an oblique right front upper side. FIG. 4 is an exploded perspective view of the vibration-proof unit 10 viewed from an oblique front side thereof. FIG. 5 is an exploded perspective view of the vibration-proof unit 10 viewed from an oblique rear side thereof. FIG. 6 is an exploded perspective view of a movable part of the vibration-proof unit 10.

The vibration-proof unit 10 comprises: a fixed frame 2 (fixed part or first fixed part) to which two first magnets 2a and 2b for driving in the X-axis direction and a second magnet 2c for driving in the Y-axis direction; a movable part 40 in which two first coils 4a and 4b for driving in the X-axis direction, a second coil 4c for driving in the Y-axis direction, and the imaging element 1 are fixed to a movable frame 4; and a yoke 6 (second fixed part, first yoke, or second yokes) made of a metal plate, such as SPCC or SUS304.

As shown in FIG. 4, the first magnet 2a is attached to an upper left corner part of a front surface of the fixed frame 2 having an approximately rectangular plate shape. More specifically, the first magnet 2a is adhered to the front surface of the fixed frame 2 by an adhesive agent with the two yokes 21 layered on each other and sandwiched between the magnet and the surface. The first magnet 2a is adhered to the fixed frame 2 in a posture in which a direction in which the magnetic poles thereof are arrayed is parallel to the X-axis.

The other first magnet 2b is adhered, in a similar manner to the above, to a left lower corner part of the front surface of the fixed frame 2 (apart from and below the first magnet 2a in the figure) with the two yokes 21 sandwiched between the magnet 2b and the corner part. The first magnet 2b is also attached to the fixed frame 2 in a posture in which a direction in which magnetic poles thereof are arrayed is parallel to the X-axis, like the first magnet 2a.

Further, the second magnet 2c is arrayed in relation to the first magnet 2b in the X-axis direction along a lower edge of the front surface of the fixed frame 2. The second magnet 2c is also adhered to the front surface of the fixed frame 2 with the two yokes 21 sandwiched between the magnet 2c and the surface. Further, the second magnet 2c is attached to the fixed frame 2, directed in a manner that a direction in which magnetic poles thereof are arrayed is parallel to the Y-axis, i.e., directed in a direction which differs by 90 degrees from the direction in which the magnetic poles of each of the first magnets 2a and 2b are arrayed.

As shown in FIGS. 4 and 5, three coils 4a, 4b, and 4c attached to the movable frame 4 are laid out at positions respectively opposed to the three magnets 2a, 2b, and 2c of the fixed frame 2 where the vibration-proof unit 10 is assembled with the movable frame 4 opposed to the fixed frame 2 (for example, a state of FIG. 3). As shown in FIG. 6, each of the coils 4a, 4b, and 4c is stored and positioned in a counter-bored part (not shown) formed in a rear surface of the movable frame 4 and is fixed thereto by an adhesive agent.

The two first coils 4a and 4b each are attached to the movable frame 4 in such a direction in which the coils 4a and 4b can move the movable frame 4 in the X-axis direction (first direction) in relation to the fixed frame 2 by an electromagnetic induction effect in combination with the respectively opposed first magnets 2a and 2b when a control current is made to flow through the coils 4a and 4b. The second coil 4c is attached to the movable frame 4 in such a direction in which the second coil 4c can move the movable frame 4 in the Y-axis direction (the second direction) in relation to the fixed frame 2 by the electromagnetic induction effect in combination with the opposed second magnet 2c when a control current is made to flow. By changing directions of the currents made to flow through the coils 4a, 4b, and 4c, the moving direction of the movable frame 4 can be switched to the opposite direction.

As shown in FIG. 6, an imaging element 1, a heat sink 42, a filter assembly 43, and a filter retainer frame 44 are further attached to the movable frame 4. The movable frame 4 comprises a substantially rectangular mount hole 41 to allow the imaging element 1 to be attached. The imaging element 1 is attached to the mount hole 41 from the rear side of the movable frame 4. The heat sink 42 is attached in contact with a rear surface of the imaging element 1.

The filter assembly 43 has a structure in which optical filters, such as an optical low pass filter and an infrared ray cut filter, are layered in the optical axis direction. The filter retainer frame 44 is arranged in the front side of the filter assembly 43 and is fixed to the movable frame 4 with a screw. In this manner, the filter assembly 43 is attached to the movable frame 4.

In a front surface of the movable frame 4, three elongated narrow counter-bored parts 41a, 41b, and 41c are provided to respectively store and arrange the two first magnetic materials 5a and 5b and a second magnetic material 5c. That is, the three magnetic materials 5a, 5b, and 5c are also movable together with the movable frame 4.

The counter-bored parts 41a and 41b for attaching the two first magnetic materials 5a and 5b are provided in the side opposite to the counter-bored parts of the first coils 4a and 4b, respectively, and are extended in the X-axis direction. That is, the two first magnetic materials 5a and 5b are opposed also to the two first magnets 2a and 2b in the side of the fixed frame 2 where the vibration-proof unit 10 is assembled. The two first magnetic materials 5a and 5b are extended respectively along array directions (first directions) of the poles of the respectively opposed magnets 2a and 2b, and areas of the two first magnetic materials projected onto the first magnets 2a and 2b fall within outer peripheral parts of the first magnets.

Conversely, the counter-bored part 41c for attaching the second magnetic material 5c is provided in the side opposite to the counter-bored part of the second coil 4c and is extended in the Y-axis direction. That is, the second magnetic material 5c is opposed also to the second magnet 2c in the side of the fixed frame 2 where the vibration-proof unit 10 is assembled. The second magnetic material 5c is extended along the array direction (second direction) of the poles of the opposed second magnet 2c, and an area of the second magnetic material 5c projected onto the second magnet 2c falls within an outer peripheral part of the second magnet 2C.

As shown in FIG. 3, the yoke 6 has an approximately U-shaped structure so as to cover the three magnets 2a, 2b, and 2c of the fixed frame 2 where the vibration-proof unit 10 is assembled. The yoke 6 is tightened and fixed to corresponding boss parts 22 on the side of the fixed frame 2 with use of three screws 6a.

That is, the yoke 6 according to the present embodiment is configured by integrally connecting the first yoke which overlaps the first magnets 2a and 2b and the first coils 4a and 4b, and the second yoke which overlaps the second magnet 2c and the second coil 4c. The yoke 6 itself functions as a second fixed part which is fixed to the fixed frame 2.

In the present embodiment, as described above, a sheet of plate-type yoke 6 is directly fixed to the fixed frame 2. However, the yoke 6 may alternatively be divided into a plurality of pieces, and may be attached to another unillustrated fixed frame (second fixed part) which is fixed to the fixed frame 2.

In any case, the first magnets 2a and 2b, the first coils 4a and 4b, and the yoke 6 function as two voice coil motors (VCM) (first driving unit) which moves the movable frame 4 in the X-axis direction in relation to the fixed frame 2. The second magnet 2c, the second coil 4c, and the yoke 6 function as another voice coil motor (VCM) (second driving unit) which moves the movable frame 4 in the Y-axis direction in relation to the fixed frame 2.

When the vibration-proof unit 10 having the structure described above is assembled, three balls 3a, 3b, and 3c (rolling elements) (refer to FIG. 4) are inserted to be sandwiched between the fixed frame 2 and the movable frame 4. Rectangle recesses 32 and 34 (refer to FIG. 11) to store the three balls 3a, 3b, and 3c each are provided in the front surface of the fixed frame 2 and in the rear surface of the movable frame 4, respectively. Bottom plates 33 and 35 (refer to FIG. 11) to suppress abrasion with the balls 3a, 3b, and 3c are provided at the bottoms of the recesses 32 and 34, respectively.

The movable part 40 is provided to be movable, floating from the fixed frame 2 (and the yoke 6). The movable part 40 is energized toward the fixed frame 2 by a magnetic attraction force which acts between the three magnetic materials 5a, 5b, and 5c provided on the movable frame 4 and the three magnets 2a, 2b, and 2c provided on the fixed frame 2. Therefore, the three balls 3a, 3b, and 3c are held pinched by the recess 32 of the fixed frame 2 and the recess 34 of the movable frame 4 with the magnetic attraction force and function as a spacer therebetween.

That is, the first magnetic material 5a and first magnet 2a function as a first magnetic spring. The first magnetic material 5b and the first magnet 2b function also as a first magnetic spring. The second magnetic material 5c and the second magnet 2c function as a second magnetic spring. Structures and functions of the magnetic springs will be described in detail later.

The three sets of magnetic springs are provided respectively at positions of VCMs (the positions of the magnets 2a, 2b, and 2c) and do therefore not always form a well-balanced layout due to relationships with supporting positions by three balls 3a, 3b, and 3c. Therefore, according to the present embodiment, a coil spring 7 is attached to be bridged between the fixed frame 2 and the movable frame 4, in addition to the three magnetic springs.

As shown in FIG. 4, the ball 3a is provided below the first magnet 2a in the figure. The ball 3b is provided between the first magnet 2b and the second magnet 2c. The ball 3c is provided near the coil spring 7. That is, the three balls 3a, 3b, and 3c support, at three points, the movable frame 4 in relation to the fixed frame 2.

In contrast, the three sets of magnetic springs are arranged at the positions of the VCMs as described above. The force of pulling the movable frame 4 toward the fixed frame 2 therefore comparatively weakens near the ball 3c. According to the present embodiment, the coil spring 7 is therefore provided at this position. An end of the coil spring 7 is attached to the movable frame 4, and the other end of the coil spring 7 is attached to the fixed frame 2.

Figure 7:
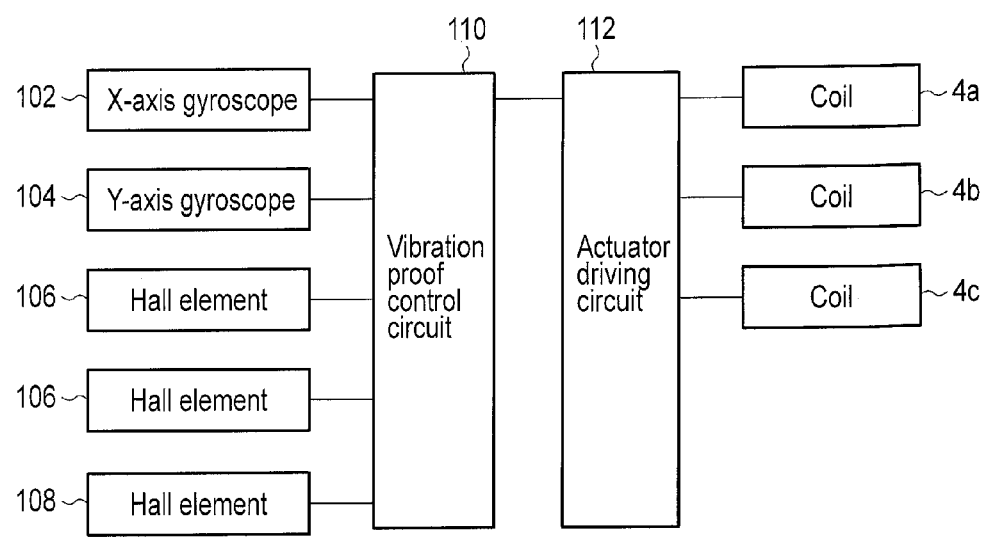
FIG. 7 is a block diagram of a control system which controls operation of the movable part of the vibration-proof unit in FIG. 2.

FIG. 7 is a block diagram of a control system which controls operation of the vibration-proof unit having a structure as described above.

The control system of the vibration-proof unit 10 comprises an X-axis gyroscope 102 and a Y-axis gyroscope 104 for detecting a blur amount of the camera 100, hall elements 106 and 108 for detecting the position of the imaging element 1 along the XY-plane of the imaging element 1, a vibration-proof control circuit 110 which calculates a blur correction amount from the detected blur amount and the position in plane directions, and an actuator driving circuit 112 which causes a drive current to flow through the coils 4a, 4b, and 4c of each of the VCMs.

As described above, according to the present embodiment, the three magnetic materials 5a, 5b, and 5c opposed respectively to the magnets 2a, 2b, and 2c are provided on the movable frame 4, separately from the yoke 6 which forms the magnetic circuits of the VCMs. Separately from the magnetic circuit of the vibration-proof unit 10, functions as magnetic springs can be implemented so that the movable frame 4 can be attracted toward the fixed frame 2 with desired appropriate magnetic attraction force F. That is, the magnetic attraction force F can be easily controlled to a desired value by changing the areas of the magnetic materials 5a, 5b, and 5c projected onto the magnets 2a, 2b, and 2c and by changing thicknesses and materials of the magnetic materials 5a, 5b, and 5c.

Also, according to the present embodiment, the magnetic materials 5a, 5b, and 5c which are formed of comparatively small light plate pieces are provided on the movable frame 4. Therefore, in comparison with a case of providing a yoke on a conventional movable part, the weight of the movable part 40 can be lightened, and power consumption of the VCMs can be reduced. Further, a number of magnetic springs are used as mechanisms for attracting the movable frame 4 to the fixed frame 2 according to the present embodiment. Therefore, when the movable frame 4 is moved in the plane direction perpendicular to the optical axis O by blur correction operation, it is possible to reduce a force (restoring force along the XY-plane directions of each magnetic spring) acting to return the movable frame 4 to an original position before the movable frame 4 is moved, and undesirable load in the plane directions can be reduced at the time of blur correction.

Conversely, if a retention structure is employed in which the movable frame 4 is attracted to the fixed frame 2 only by magnetic springs, there is a possibility that the movable frame 4 vibrates greatly beyond an amplitude intended by the control when a control current having a frequency component corresponding to a resonance frequency specific to the vibration-proof unit 10 is made to flow through the coils 4a, 4b, and 4c. Consequently, there can be a drawback that a long time is needed until vibration attenuates. Therefore, the coil spring 7 which mechanically attracts the movable frame 4 to the fixed frame 2 is provided to allow the drawback as described above due to resonance to be suppressed by control.

Also as described above, if the coil spring 7 is provided so as to compensate for a magnetic attraction force of the magnetic springs provided only at the positions of the VCMs, the balance of force in the Z-axis direction in the XY-plane can be improved excellently, and the vibration-proof unit 10 can be operated stably. Further, assemblability of the vibration-proof unit 10 can be greatly improved by providing not only magnetic springs but also the coil spring 7.

However, the configuration of coil spring 7 is not mandatory in the present invention. Insofar as the drawback due to resonance can be solved, the single coil spring 7 may be replaced with a magnetic spring. Alternatively, the coil spring 7 may be simply omitted.

Figure 8:
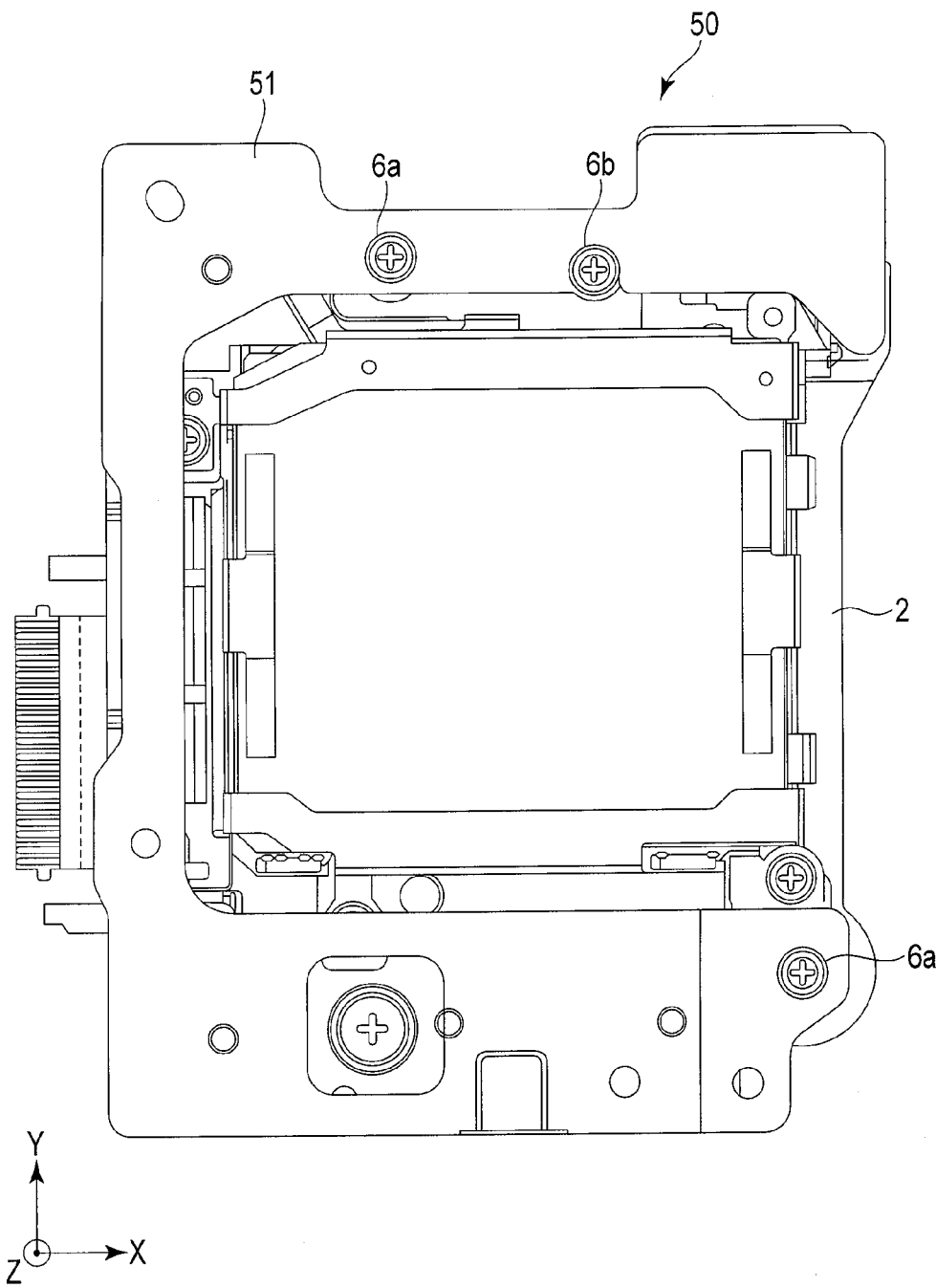
FIG. 8 is a front view showing a vibration-proof unit according to the second embodiment.
Figure 9:
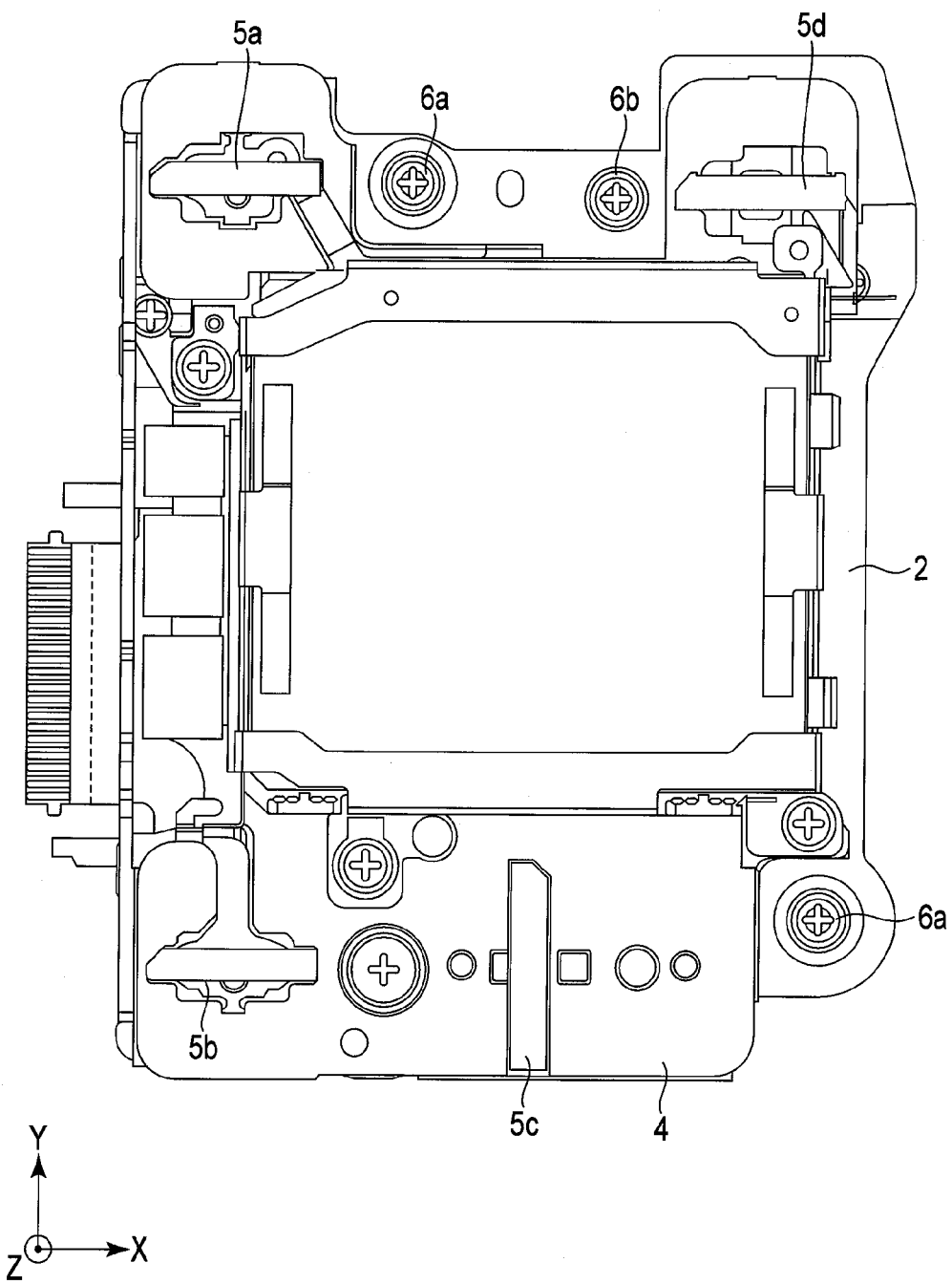
FIG. 9 is a front view of the movable part of the vibration-proof unit in FIG. 8 wherein a yoke is removed.

FIG. 8 is a front view of a vibration-proof unit 50 according to the second embodiment without a coil spring 7, viewed from a front side along an optical axis O. FIG. 9 is a front view of the vibration-proof unit 50 of FIG. 8 from which a yoke 51 is removed. Here, components which function in the same manner as the vibration-proof unit 10 according to the first embodiment described above will be denoted with the same reference signs as in the first embodiment, and detailed descriptions thereof will be omitted herefrom.

The vibration-proof unit 50 according to the present embodiment comprises a fourth magnetic spring at the position to which the coil spring 7 is attached in the first embodiment. The fourth magnetic spring comprises an elongated narrow plate-type magnetic material 5d extending in the X-axis direction, as shown in FIG. 9. The magnetic material 5d is fixed to a front surface of a movable frame 4 in the same manner as other magnetic materials 5a, 5b, and 5c. Further, an unillustrated magnet specialized only for a magnetic spring is adhered to a front surface of a fixed frame 2 opposed to the magnetic material 5d. This magnet is provided in a posture in which a direction in which magnetic poles thereof are arrayed extends along the X-axis.

With respect to the fourth magnetic spring, magnetic attraction force F can also be controlled to a desired arbitrary value by changing an area of the magnetic material 5d projected onto an opposed magnet and by changing a thickness in a Z-axis direction, as in the other three magnetic springs described above.

As described above, according to the second embodiment, only magnetic springs are used as a retention mechanism of the movable part 4 without using a coil spring 7. Therefore, undesirable force (force acting to return the movable part 4 to a neutral position) along the XY-plane, which is applied to the movable part 4 at the time of blur correction operation, can be reduced, and the power consumption of VCMs can be accordingly reduced.

Also according to the present embodiment, only magnetic springs are used, and therefore, an installation space thereof can be reduced more in comparison with a case of using the coil spring 7. Accordingly, the apparatus configuration can be more compact, which contributes to miniaturization of the apparatus.

Further, if only magnetic springs are used as in the present embodiment, friction noise which can be generated at two ends of a coil spring 7 when the coil spring 7 is used can be eliminated. Accordingly, convenience for users can be improved.

Figure 10:
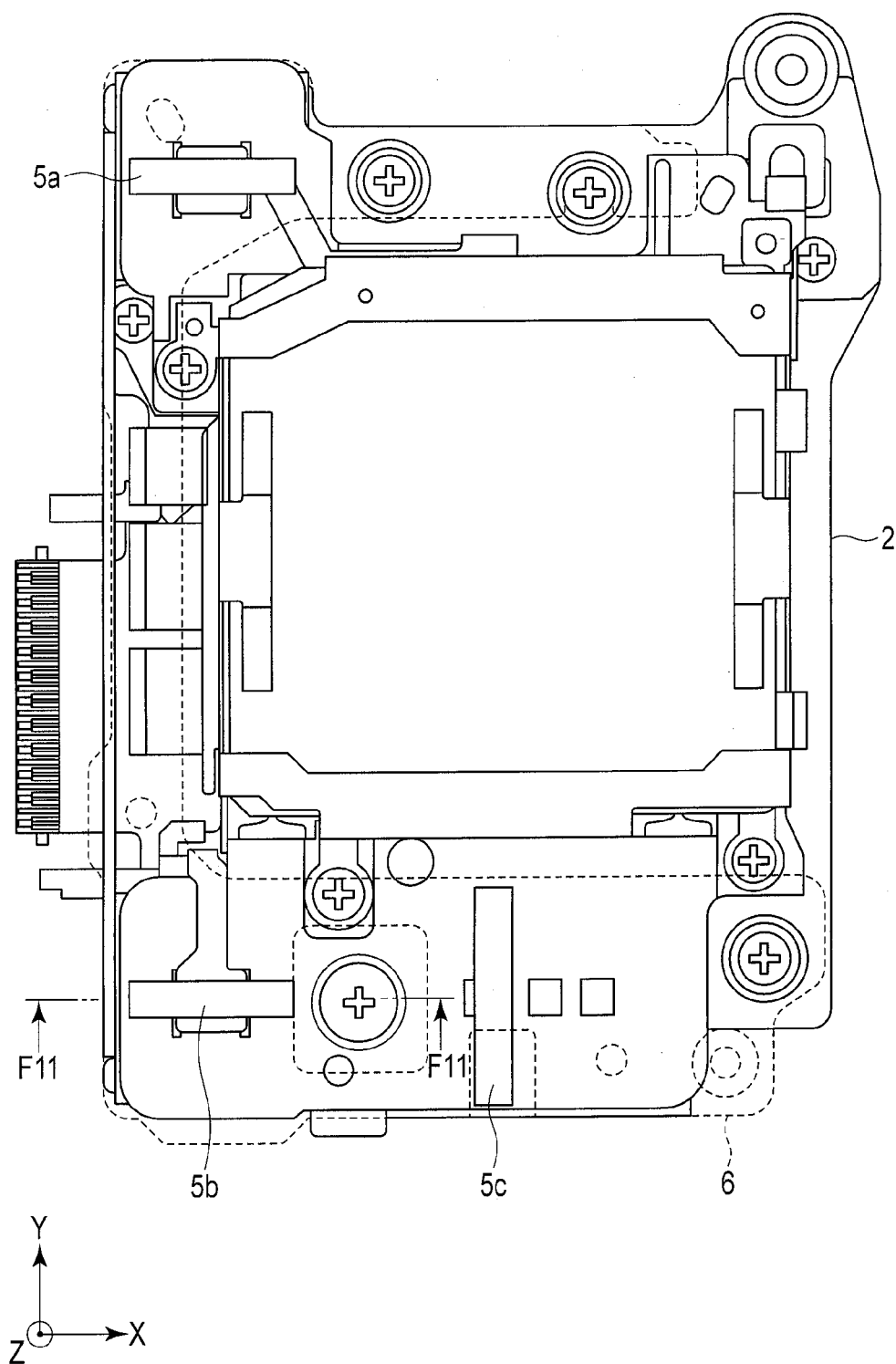
FIG. 10 is a front view showing the vibration-proof unit in FIG. 3 in which a yoke is shown in dot line.
Figure 12:
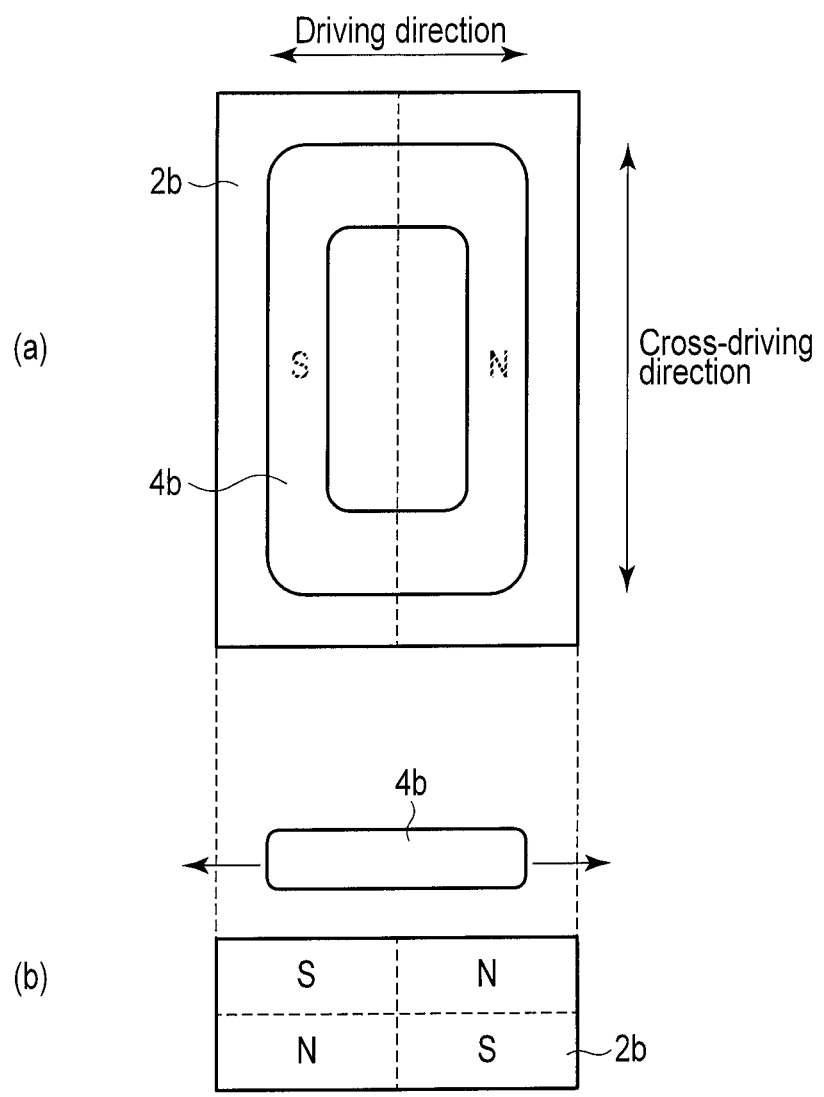
FIG. 12 includes a front view (a) and a side view (b), showing a relationship between a magnet and a coil of the vibration-proof unit in FIG. 3.

Hereinafter, the structure and function of magnetic springs in each of the foregoing embodiments will be described in more detail with reference to FIGS. 10 and 11. FIG. 10 is a front view of the vibration-proof unit 10 in the first embodiment viewed from the front side along the direction of optical-axis O. FIG. 11 is a sectional view partially taken along F11-F11 in FIG. 10. Since three magnetic springs function similarly, only the magnetic spring including the magnetic material 5b will now be described as a representative, and descriptions of the other magnetic springs will be omitted herefrom. In FIG. 10, a yoke 6 is drawn with broken lines, in order to show the position and direction of the magnetic material 5b in the XY-plane.

As shown in FIG. 11, a ball 3b (3a and 3c) is provided between a movable frame 4 holding a coil 4b (4a and 4c) and a magnetic material 5b (5a and 5c) and a fixed frame 2 holding a magnet 2b (2a and 2c). A recess 32 to receive the ball 3b is provided in a front surface of the fixed frame 2, and a bottom plate 33 is provided on the bottom of the recess 32. A recess 34 to receive the ball 3b is provided in a rear surface of the movable frame 4, and a bottom plate 35 is provided at the bottom of the recess 34.

The distance between a surface of the bottom plate 33 with which the ball 3b has point-contact and the front surface of the fixed frame 2, and the distance between a surface of the bottom plate 35 with which the ball 3b has point-contact and the rear surface of the movable frame 4 are set to values which are added to become smaller than the diameter of the ball 3b. Therefore, a gap is formed between the front surface of the fixed frame 2 and the rear surface of the movable frame 4 which are opposed to each other with the ball 3b inserted between each other. By providing a gap as described above, the movable frame 4 is made to float from the fixed frame 2, and the movable frame 4 is made movable along the XY-plane. When the movable frame 4 moves in a plane direction in relation to the fixed frame 2, the ball 3b rolls inside the recesses 32 and 34.

At the position opposed along the direction of optical-axis O to the first magnet 2b fixed to the front surface of the fixed frame 2, the first coil 4b, first magnetic material 5b, and yoke 6 are arranged, layered on each other in this order. The first coil 4b is stored and arranged in and fixed to a counter-bored part formed in the rear surface of the movable frame 4. The first magnetic material 5b is stored and arranged in and fixed to a counter-bored part 41b formed in the front surface of the movable frame 4 in the side opposite to the first coil 4b. The first coil 4b and the first magnetic material 5b are not in contact with each other. Further, the hall element 106 for detecting the position of the movable frame 4 in the X-axis direction is fixed to the movable frame 4. The hall element 106 is provided in the center of the coil 4b.

As shown in FIG. 10, the first magnetic material 5b is extended in the X-axis direction, and extends in the direction in which the magnetic poles of the opposed magnet 2b are arrayed. Thus, the magnetic attraction force F in the direction denoted by an arrow F in FIG. 11 or, namely, the direction towards the first magnet 2b acts on the first magnetic material 5b opposed to the first magnet 2b and fixed to the movable frame 4. This magnetic attraction force F acts on the movable frame 4 holding the first magnetic material 5b, and becomes a force holding the movable frame 4 in a direction towards the fixed frame 2.

Next, with reference to FIGS. 12, 13, 14, 15, 16, 17, 18, and 19, a description will be made of a relationship between strength of magnetic springs and the shape of the first magnetic material 5b (including the layout of the first magnetic material 5b). The description below also pays attention to the magnetic spring including the first magnetic material 5b. Needless to say, however, the same description applies to the other magnetic springs.

FIG. 12A is a front view showing a relationship between the first magnet 2b and the first coil 4b. FIG. 12B is a side view thereof. The first magnet 2b is fixed to the fixed frame 2, and the first coil 4b is fixed to the movable frame 4. There is a gap between both the magnet and the coil. When a control current flows through the first coil 4b, the movable frame 4 (not shown here) comprising the first coil 4b is moved in an array direction of magnetic poles in relation to the fixed frame 2 (not shown here) comprising the first magnet 2b. Hereinafter, this direction will be referred to as a driving direction. Further, a direction perpendicular to the driving direction will be referred to as a cross-driving direction.

Figure 13:
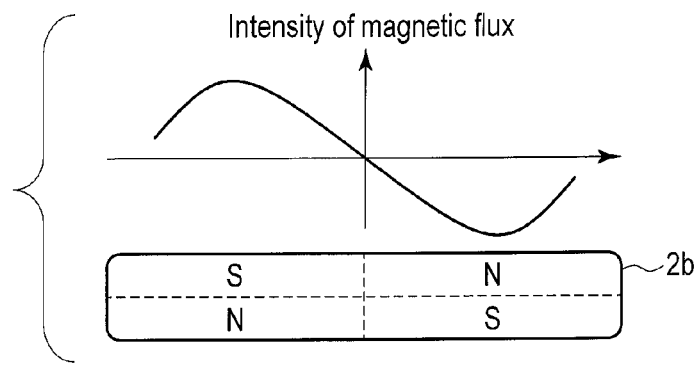
FIG. 13 shows an intensity distribution of magnetic flux along a driving direction in FIG. 12.
Figure 14:
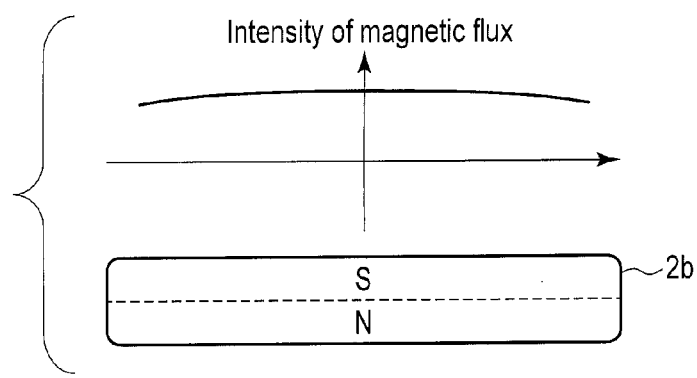
FIG. 14 shows an intensity distribution of magnetic flux along a cross-driving direction in FIG. 12.

Intensity distribution (profile) of magnetic flux in the front side of the first magnet 2b or, namely, in the side in which the first coil 4b and the first magnetic material 5b are arranged varies between the driving direction and the cross-driving direction. As is known from the intensity distribution of the magnetic flux along the driving direction, the direction of the magnetic flux is inverted at a branching position of the two poles and the intensity is found to change greatly, as shown in FIG. 13. On the other hand, as is known from the intensity distribution of the magnetic flux along the cross-driving direction, there is substantially no change as a constant intensity is exerted, as shown in FIG. 14.

The first magnetic material 5b according to the present embodiment is extended in the driving direction, opposed to the first magnet 2b, and is therefore easily influenced by the intensity distribution shown in FIG. 13. As has been described above, the direction of the magnetic flux of the first magnet 2b is inverted along the array direction of the magnetic poles thereof. Therefore, the first magnetic material 5b extended in the driving direction and opposed to the first magnet 2b is also magnetized by the poles opposite to the poles of the opposed first magnet 2b, as shown in FIGS. 15 and 16.

Figure 15:
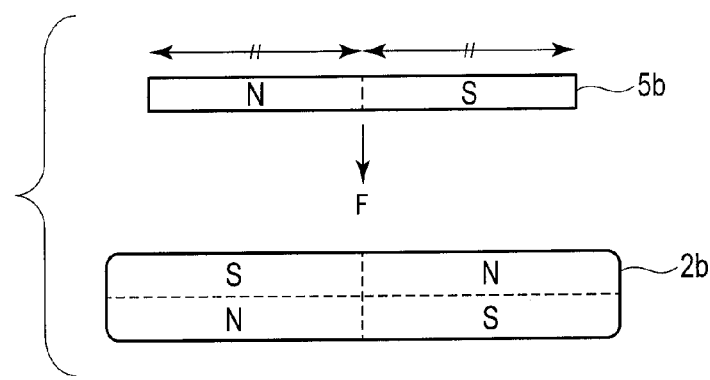
FIG. 15 is an operation view for explaining behaviors of a magnetic material provided on the movable part of the vibration-proof unit in FIG. 3.

At this time, if the lengths of areas of the first magnetic material 5b which are opposed to the two magnetic poles of the first magnet 2b are equal to each other, as shown in FIG. 15, i.e., if the lengths of areas where the first magnetic material 5b is opposed to the magnetic poles of the first magnet 2b are equal to each other, the exact center of the first magnet 5b is a boundary of magnetized magnetic poles, and magnetic forces are maintained balanced. That is, in this case, the force acting on the first magnetic material 5b is substantially only the magnetic attraction force F in a direction toward the first magnet 2b, and a force acting in the driving direction is not generated.

Figure 16:
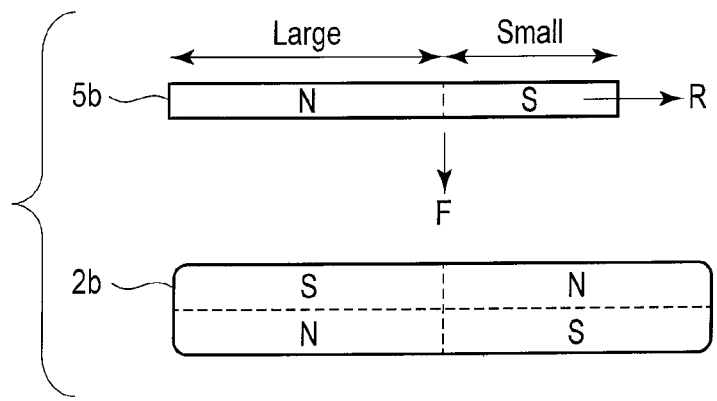
FIG. 16 is an operation view for explaining, together with FIG. 15, behaviors of the magnetic material provided on the movable part of the vibration-proof unit in FIG. 3.

In contrast, when the first magnetic material 5b moves in the driving direction in relation to the first magnet 2b, as shown in FIG. 16, the area size of the first magnetic material 5b which is magnetized changes, and the magnetic force is unbalanced. For example, when the first magnetic material 5b shifts leftward in the figure in relation to the first magnet 2b, as shown in the figure, the left area of the first magnetic material 5b which is opposed to the S-pole in the left side of the first magnet 2b in the figure is magnetized to the N-pole. The length of this area accordingly increases to be greater than the other area in the right side which is magnetized to the S-pole. In this case, a force to return in the direction of maintaining the balance of the magnetic force (i.e., the rightward direction in the figure) acts on the magnetic material 5b. That is, this force turns into the restoring force R in the driving direction along the XY-plane of the magnetic spring.

From a different viewpoint, the restoring force R in the driving direction serves as a load at the time of driving the movable part 4. That is, if the restoring force R in the driving direction is intensified excessively, the power consumption of the VCMs increases and the operating time of a battery shortens. On the other hand, when a coil spring is used, the spring needs to be long in order to reduce the restoring force to suppress power consumption because the restoring force in the driving direction is proportional to a spring constant. Consequently, the installation space thereof increases.

Further, as a matter of course, there is an appropriate value for the magnetic attraction force F in the direction of attracting the first magnetic material 5b to the first magnet 2b. If the magnetic attraction force F is too small, driving of the movable part 4 becomes unstable. Conversely, if the magnetic attraction force F is too great, a problem of abrasion occurs due to the balls 3a, 3b, and 3c. Therefore, when a magnetic spring is used as in the present embodiment, the intensity of a spring or, namely, the magnetic attraction force F and the restoring force R are desirably designed to be appropriate values.

Figure 17:
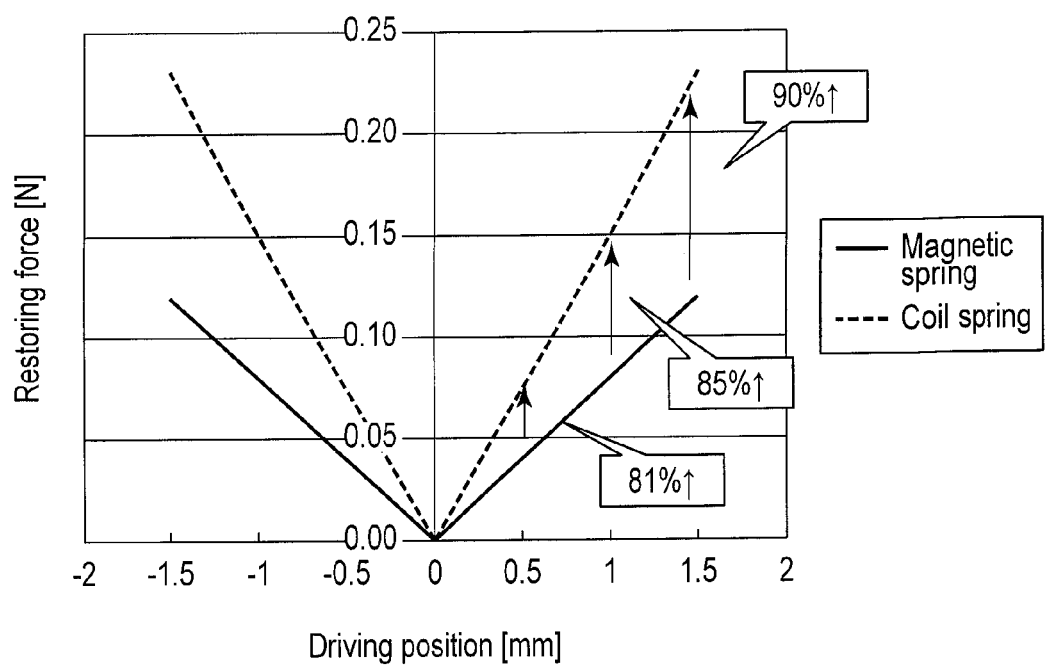
FIG. 17 is a graph showing a relationship between movement of the magnetic material in FIG. 16 and a restoring force which acts on the magnetic material.

FIG. 17 is a graph which shows a relationship between the movement of the magnetic spring along the driving direction of the first magnetic material 5b and the restoring force R thereof along the driving direction, according to the present embodiment. For comparison, another relationship is shown between a shift amount of a coil spring along an XY-plane thereof and restoring force thereof along a plane direction thereof, where the coil spring generates an attraction force of the same size as the magnetic attraction force F of the magnetic spring as described above. According to this graph, the restoring force of the coil spring is found to be higher by 80 to 90% than the restoring force of the magnetic spring. That is, the restoring force can be reduced to be comparatively small by using a magnetic spring.

According to the present embodiment, in addition to use of characteristics of a magnetic spring as described above, the magnetic attraction force F of the magnetic spring is controlled to a value, separately from the restoring force R of the magnetic spring.

Basically, the first magnetic material 5b needs to be long along the driving direction to some extent, in order to make the restoring force R described above act on the magnetic material 5b. In this sense, if the first elongated narrow magnetic material 5b is extended in the cross-driving direction along the polarization line D of the first magnet 2b, the restoring force in the driving direction cannot substantially be made to act on the magnetic material 5b.

Figure 18:
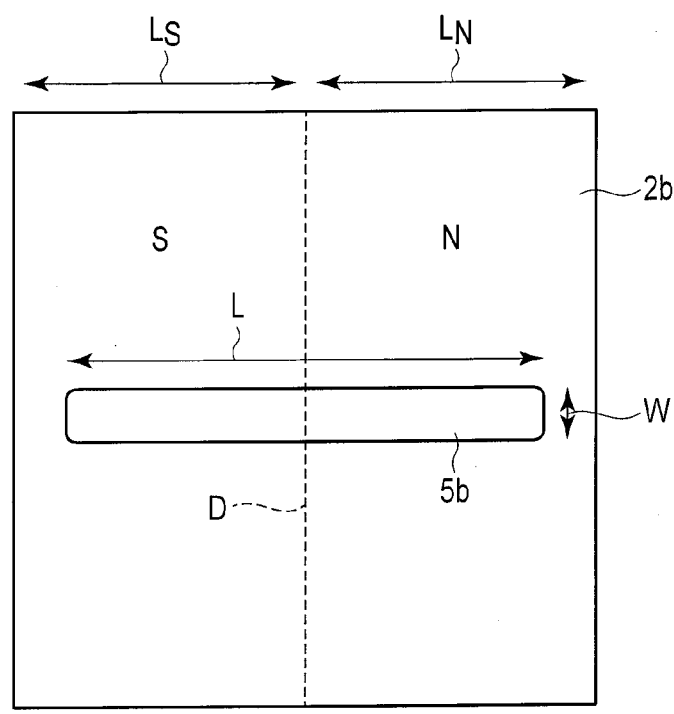
FIG. 18 is a view for explaining appropriate dimensions of the magnetic material provided on the movable part of the vibration-proof unit in FIG. 3.
Figure 19:
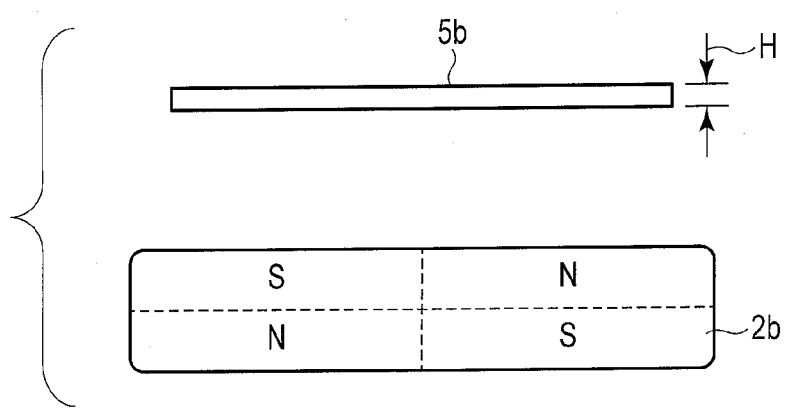
FIG. 19 is a side view of FIG. 18.

As shown in FIG. 18, the lengths of the S-pole and the N pole of the first magnet 2b along the array direction thereof are expressed as $L_S$ and $L_N$, respectively. Where a movement amount of the movable part 4 holding the first magnetic material 5b is supposed not to exceed the length $L_S$ ($L_N$) of each of the poles, the length L of the first magnetic material 5b along the driving direction need only be longer than the length $L_S$ ($L_N$) of the corresponding pole. In other words, the lower limit of the length of the first magnetic material 5b need only be such a length that causes at least part of the first magnetic material 5b to overlap the polarization line D of the first magnet 2b when the movable part 4 moves in relation to the fixed frame 2. The polarization line D represents a virtual line which expresses a boundary between the S-pole and the N-pole.

On the other hand, the magnetic attraction force F which acts on the first magnetic material 5b changes in accordance with the projection area of the first magnet 5b on the first magnet 2b, i.e., the length L and the width W of the first magnetic material 5b, the thickness H of the first magnetic material 5b along the direction of optical-axis O (refer to FIG. 19), and the distance from the first magnetic material 5b to the first magnet 2b. In other words, the magnetic attraction force F acting on the first magnetic material 5b can be controlled to a desired value by adjusting at least one of the dimensions (L, W, H) of the first magnetic material 5b and the distance thereof to the first magnet 2b.

That is, according to the present embodiment, after setting the restoring force R of a magnetic spring to an appropriate value, the magnetic attraction force F of the magnetic spring can be set to a desired value, irrespective of the restoring force R. Accordingly, efficient and stable blur correction operation can be achieved.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

For example, the foregoing embodiments have been described with respect to a case that the magnets 2a, 2b, and 2c are provided on the fixed frame 2 and the magnetic materials 5a, 5b, and 5c are provided on the movable frame 4. However, the present invention is applicable also to a vibration-proof unit of a moving magnet type in which magnets 2a, 2b, and 2c are provided on a movable frame 4, as in a modification shown in FIG. 20. Also in this case, a magnetic attraction force of a corresponding magnetic spring can be controlled to a desired value by changing the dimensions of magnetic materials 5a, 5b, and 5c fixed to a fixed frame 2 and the distance between the magnetic materials 5a, 5b, and 5c and the magnets 2a, 2b, and 2c.

The invention claimed is:

1. A retention mechanism comprising:
a fixed part;
a movable part arrayed to be opposed to the fixed part;
a plurality of rolling elements which are arranged between the fixed part and the movable part and support the movable part to be movable in relation to the fixed part along a plane perpendicular to an array direction of the movable part in relation to the fixed part;
a magnet provided on one of the fixed part and the movable part and having magnetic poles arrayed in a first direction perpendicular to the array direction; and
a magnetic material which is provided on the other one of the fixed part and the movable part, and opposed to the magnet so as to form, in combination with the magnet, a magnetic spring, the magnetic material being extended in the first direction in which the magnetic poles of the magnet are arrayed,
wherein the magnetic material is an elongated narrow plate member which is extended in the first direction along the perpendicular plane,
wherein the magnetic material is positioned to be opposed to the magnet in a positional relationship in which area sizes of two areas of the magnetic material respectively projected onto the magnetic poles of the magnet are equal to each other, and
wherein the magnetic material has a size such that an area thereof projected onto the magnet is inside an outer peripheral part of the magnet.

2. A retention mechanism comprising:
a fixed part;
a movable part arrayed to be opposed to the fixed part;
a plurality of rolling elements which are arranged between the fixed part and the movable part and support the movable part to be movable in relation to the fixed part along a plane perpendicular to an array direction of the movable part in relation to the fixed part;
a magnet provided on one of the fixed part and the movable part and having magnetic poles arrayed in a first direction perpendicular to the array direction; and
a magnetic material which is provided on the other one of the fixed part and the movable part, and opposed to the magnet so as to form, in combination with the magnet, a magnetic spring, the magnetic material being extended in the first direction in which the magnetic poles of the magnet are arrayed,
wherein the magnetic material is an elongated narrow plate member which is extended in the first direction along the perpendicular plane,
wherein the magnetic material is positioned to be opposed to the magnet in a positional relationship in which area sizes of two areas of the magnetic material respectively projected onto the magnetic poles of the magnet are equal to each other, and
wherein a length of the magnetic material along the first direction is longer than a length of each of the magnetic poles of the magnet along the first direction.

3. A blur connection apparatus comprising:
a fixed part;
a movable part which holds an optical member as a target of a blur correction and is arrayed along an optical axis of the optical member in relation to the fixed part;
a plurality of rolling elements which are arranged between the fixed part and the movable part and support the movable part to be movable along a plane perpendicular to the optical axis direction in relation to the fixed part;
a first magnet provided on one of the fixed part and the movable part and having magnetic poles arrayed in a first direction perpendicular to the optical axis direction;
a first coil which is opposed to the first magnet and is provided on the other one of the fixed part and the movable part;

a first magnetic material which is provided on the other one of the fixed part and the movable part, and opposed to the first magnet so as to form, in combination with the first magnet, a first magnetic spring, the first magnetic material being extended in the first direction in which the magnetic poles of the first magnet are arrayed;

a second magnet provided on one of the fixed part and the movable part and having magnetic poles arrayed in a second direction perpendicular to the optical axis direction and the first direction;

a second coil which is opposed to the second magnet and is provided on the other one of the fixed part and the movable part; and a second magnetic material which is provided on the other one of the fixed part and the movable part, and opposed to the second magnet so as to form, in combination with the second magnet, a second magnetic spring, the second magnetic material being extended in the second direction in which the magnetic poles of the second magnet are arrayed, wherein the first magnetic material is an elongated narrow plate member extended in the first direction along the perpendicular plane, and the second magnetic material is an elongated narrow plate member extended in the second direction along the perpendicular plane, wherein the first magnetic material is positioned to be opposed to the first magnet in a positional relationship in which sizes of two areas of the first magnetic material respectively projected onto the magnetic poles of the first magnet are equal to each other, and the second magnetic material is positioned to be opposed to the second magnet in a positional relationship in which sizes of two areas of the second magnetic material respectively projected onto the magnetic poles of the second magnet are equal to each other, and wherein the first magnetic material has a size such that an area thereof projected onto the first magnet is arranged within an outer peripheral part of the first magnet, and the second magnetic material has a size such that an area thereof projected onto the second magnet is arranged within an outer peripheral part of the second magnet.

4. A blur connection apparatus comprising:

a fixed part;

a movable part which holds an optical member as a target of a blur correction and is arrayed along an optical axis of the optical member in relation to the fixed part;

a plurality of rolling elements which are arranged between the fixed part and the movable part and support the movable part to be movable along a plane perpendicular to the optical axis direction in relation to the fixed part;

a first magnet provided on one of the fixed part and the movable part and having magnetic poles arrayed in a first direction perpendicular to the optical axis direction;

a first coil which is opposed to the first magnet and is provided on the other one of the fixed part and the movable part;

a first magnetic material which is provided on the other one of the fixed part and the movable part, and opposed to the first magnet so as to form, in combination with the first magnet, a first magnetic spring, the first magnetic material being extended in the first direction in which the magnetic poles of the first magnet are arrayed;

a second magnet provided on one of the fixed part and the movable part and having magnetic poles arrayed in a second direction perpendicular to the optical axis direction and the first direction;

a second coil which is opposed to the second magnet and is provided on the other one of the fixed part and the movable part; and a second magnetic material which is provided on the other one of the fixed part and the movable part, and opposed to the second magnet so as to form, in combination with the second magnet, a second magnetic spring, the second magnetic material being extended in the second direction in which the magnetic poles of the second magnet are arrayed, wherein the first magnetic material is an elongated narrow plate member extended in the first direction along the perpendicular plane, and the second magnetic material is an elongated narrow plate member extended in the second direction along the perpendicular plane, wherein the first magnetic material is positioned to be opposed to the first magnet in a positional relationship in which sizes of two areas of the first magnetic material respectively projected onto the magnetic poles of the first magnet are equal to each other, and the second magnetic material is positioned to be opposed to the second magnet in a positional relationship in which sizes of two areas of the second magnetic material respectively projected onto the magnetic poles of the second magnet are equal to each other, and wherein a length of the first magnetic material along the first direction is longer than a length of each of the poles of the first magnet along the first direction, and a length of the second magnetic material along the second direction is longer than a length of each of the poles of the second magnet along the second direction.

* * * * *